United States Patent [19]

Schmölzer et al.

[11] 4,278,580

[45] Jul. 14, 1981

[54] CATHODICALLY DEPOSITABLE PAINT BINDERS AND PROCESS FOR PRODUCING SAME

[75] Inventors: Gerhard Schmölzer; Wolfgang Daimer; Heiner Verdino, all of Graz, Austria

[73] Assignee: Vianova Kunstharz, A.G., Werndorf, Austria

[21] Appl. No.: 135,861

[22] Filed: Mar. 31, 1980

[30] Foreign Application Priority Data

Apr. 9, 1979 [AT] Austria ................................ 2606/79

[51] Int. Cl.$^3$ ........................ C08G 18/80; C08G 59/14
[52] U.S. Cl. ........................ 260/29.2 EP; 204/181 C; 260/29.2 TN; 525/507; 528/45; 528/73
[58] Field of Search ................ 260/29.2 EP, 29.2 TN; 528/45, 73; 525/507

[56] References Cited

U.S. PATENT DOCUMENTS

| | | | |
|---|---|---|---|
| 3,922,253 | 11/1975 | Jerabek et al. | 528/45 |
| 3,928,156 | 12/1975 | Wismer et al. | 260/29.2 EP X |
| 3,984,299 | 10/1976 | Jerabek | 204/181 |
| 4,031,050 | 6/1977 | Jerabek | 260/29.2 TN |
| 4,036,795 | 7/1977 | Tominaga | 260/18 PN |
| 4,134,866 | 1/1979 | Tominaga et al. | 260/18 PN |

*Primary Examiner*—Earl A. Nielsen
*Attorney, Agent, or Firm*—A. W. Breiner

[57] ABSTRACT

Cathodically depositable paint binders, water-soluble upon neutralization with acids, and the method of preparing the paint binders based on amine-epoxy adducts which crosslink at elevated temperature through polyurethane formation are described. The paint binders are prepared by reacting per mole of expoxide groups of a polymer having an epoxy equivalent of between about 180 and 1500 from about 3 to 70 mole percent of a polyisocyanate adduct having substantially no free NCO content and carrying per molecule at least one carboxyl group. Basic functionality is provided by reacting the epoxy-containing polymer, before or after reaction with the polyisocyanate adduct, with secondary aliphatic amines and/or alkanol amines. The binders, in addition to providing stable aqueous solutions when neutralized with an inorganic or organic acid, have good resistance to corrosion and solvents.

13 Claims, No Drawings

CATHODICALLY DEPOSITABLE PAINT BINDERS AND PROCESS FOR PRODUCING SAME

This invention is directed to a process for the preparation of cathodically depositable binders based on amine adducts of polymers containing epoxy groups and which are crosslinked through urethane formation.

Cathodically depositable paint binders based on amine-epoxy adducts are known, e.g., from DE-OS Nos. 24 15 100 and 25 16 897. Since such reaction products, by themselves, do not give hardenable coatings, a number of hardening components has been suggested, either used in admixture with or as reaction products with the basic epoxy-amine adduct. Evaluation of the various proposals has shown that in practice only those hardening components which contain blocked di- or polyisocyanates give satisfactory results. In the event the hardening component, as disclosed in U.S. Pat. Nos. 4,031,050; 3,953,391; 3,984,299 or in DE-OS No. 21 31 060, is a water-insoluble totally blocked di- or polyisocyanate and is used in admixture with the amine-epoxy adducts, on electrodeposition there is the known hazard of a separation of the components by disproportioning of the bath or similar effects.

U.S. Pat. No. 3,939,051 and DE-AS No. 22 52 536 avoid separation by reacting partially blocked di- or polyisocyanates, containing one free NCO-group, with isocyanate reactive groups of the polymer. The disadvantage of the method disclosed in U.S. Pat. No. 3,939,051 and DE-AS No. 22 52 536 is the restricted selection of suitable isocyanates. For assurance of a satisfactory reaction only those diisocyanates which have isocyanate groups with markedly distinct reactivity of the isocyanate groups can be used. In any other case the preparation of polyisocyanates with one free NCO-group under normal conditions is not possible. One obtains, in such cases, mixtures of totally blocked polyisocyanates with the described disadvantages and compounds carrying more than one NCO-group in the molecule which, on subsequent reaction with the polymers, leads to uncontrollable molecule linkages with attendant rises in viscosity or to gelation. In practice, therefore, the method disclosed in the aforesaid patents is restricted to a certain group of diisocyanates. Since these semi-blocked diisocyanates only have one NCO-group for the crosslinking reaction, the paints have unsatisfactory crosslinking density, in turn leading to poor resistance characteristics to solvents and corrosion.

DE-OS No. 27 08 611 or Japan Kokai Nos. 75/139 827 and 75/139 829 disclose carboxyl group containing polyurethane prepolymers obtained through reaction of di- or polyisocyanates with an oxycarboxylic acid and with blocking of the free NCO-group. According to the mentioned references, the compounds obtained can be rendered water-soluble or water-dispersible through neutralization of the carboxy groups with bases and can, thus, serve as a hardening component in anionic waterborne paints.

It has now been found that polyisocyanate adducts built according to the aforesaid principle can be used in the preparation of cathodically depositable paint binders without the disadvantages of the products of the prior art. In this way, carboxy group containing polyisocyanate adducts are built into a polymer carrying epoxy groups and optionally containing basic nitrogen groups, through reaction of the carboxy groups with the epoxy groups. In this method it was surprising and unforeseeable that at the necessary reaction temperatures practically no blocked isocyanate groups are set free and, thus, no undesired side reactions occur.

The present invention is, therefore, directed to paint binders and to a process for producing paint binders, particularly suitable for cathodic deposition according to the electrocoating process, soluble upon neutralization with organic or inorganic acids, based on epoxyamine adducts which crosslink at elevated temperature through polyurethane formation and characterized in that 3-70 mole percent, preferably 5-40 mole percent, of the epoxy groups of an epoxy group containing polymer with an epoxy equivalent of between 180 and 1500 are reacted at from 80° to 160° C. with a polyisocyanate adduct substantially free of NCO-groups and carrying per molecule at least 1, preferably 1 to 2, free carboxy groups; and where at least 50% of the epoxy group which do not react with the polyisocyanate adduct are reacted, prior or after reaction with the polyisocyanate adduct, at from 20° to 150° C. in known manner, with secondary (cyclo)aliphatic amines and/or alkanol amines, to provide a final product having a maximum acid value of 5 mg KOH/g and an amine value of from 24 to 150 mg KOH/g. The invention is also directed to the water-soluble coating compositions containing the above-described water-soluble binders.

The paint binders according to the present invention exhibit excellent resistance characteristics toward solvents and corrosion. Through the reaction of the epoxy group containing resin-like polymers with the carboxyl group containing polyisocyanate adducts, it is assured that the paint binders afford a uniform composition and deposition.

Suitable epoxy group containing polymers, hereinafter referred to as epoxy resins, carry an average of 2 or more epoxy groups, the chain end groups having a preferred reactivity. However, the process is also applicable to epoxy resins with epoxy groups other than in chain end position, provided the reaction conditions are suitable. The epoxy resins have an epoxy equivalent of between 180 and 1500. Preferred epoxy resins are bisphenol polyglycidylethers, novolak polyglycidylethers of aliphatic di- and polyalcohols and epoxidized polybutadienes. The latter are particularly suitable for flexibilizing the coatings, in conjunction with the above-mentioned epoxy resins.

The polyisocyanate addition products (adducts) used for reaction with the epoxy group containing polymers are, in general, prepared through reaction of hydroxycarboxylic acids, such as dimethylolpropionic acid, tartaric acid, glycollic acid, salicylic acid, bis-(hydroxyphenyl)alkane acids, and the like, with di- or polyisocyanates and blocking of the free NCO-groups by conventional masking means. The preferred adducts for use in the present invention are those composed of dihydroxy carboxylic acids, diisocyanates and monofunctional masking agents, in a mole ratio of about 1:2:2 and with an average molecular weight of below 2000. Preferred dihydroxy carboxylic acids are dimethylol propionic acid, tartaric acid, and bis-(4-hydroxyphenyl)-acetic acid. It is advantageous at times to co-employ salicylic acid in the preparation of the adducts.

The preferred diisocyanates are 2,4-toluene-diisocyanate; 2,6-toluene-diisocyanate;methylene-bis-(cyclohexyl)diisocyanate; diphenylmethanediisocyanate; isophoronediisocyanate; trimethylhexamethylenediisocyanate; hexamethylenediisocyanate, and 1,3-bis-(4'-methyl-3'-isocyanatophenyl)-uretdion. Polyisocyanates such as triphenylmethanetriisocyanate; polymethylenepolyphenylisocyanate, or trimerized products of diisocyanates such as the triisocyanatoisocyanurate of isophoronediisocyanate can also be used. The isocyanates can be masked by reaction with compounds containing an active hydrogen atom such as alcohols, monoethers of ethyleneglycol, ketoximes, ε-caprolactame, pyrrolidone, piperidone-2, aceto-acetic acid ester, malonic acid ester, acetylacetone, hydroxamic acids, phthalimide, imidazol, and the like.

The reaction between the hydroxy carboxylic acid, diisocyanate and masking agent can be effected in one or two steps. The presence of inert solvents such as the ketones, dimethylformamide, esters, and the like is, in general, desirable. The reaction is carried to the lowest possible NCO content, possibly to below 1%, in order not to adversely influence the storage stability of the adducts. The carboxy group containing polyisocyanate adducts have acid numbers of 10 to 150 mg KOH/g and a content of masked NCO-groups of 2 to 34%, calculated on nonvolatile substance.

The reaction between the epoxy resin and the carboxy functional polyisocyanate adduct can be effected before or after the reaction of the epoxy groups with the amine or alkanol amine. The reaction is carried out at 80° to 160° C.; the presence of alkali catalysts such as sodium carbonate, tertiary or quaternary amines is preferred. Furthermore, the presence of solvents is advantageous.

The weight ratios of the components are chosen in order that, per mole of epoxy group, 3 to 70 mole percent and preferably 5 to 40 mole percent carboxy groups of the polyisocyanate adduct are used. The reaction is carried to a substantially complete conversion of the carboxy groups, i.e., to an acid value in the final reaction product of below 5 mg KOH/g.

Basic groups are introduced into the binders by reacting at least 50% of the epoxy groups on the epoxy resin not consumed in the reaction of the epoxy resin with the polyisocyanate adduct with secondary (cyclo)-aliphatic amines and/or alkanol amines. Suitable amines are diethylamine, dipropylamine, dibutylamine or their isomers and homologues. Polyamines carrying primary amine groups in addition to the secondary amine groups are also suitable. In the latter case the primary amine groups have to be masked, for example as ketimines through reaction with ketones, eliminating the water, in order to avoid a polyreaction with the epoxy resin and the possibility of premature gelation.

The reaction between the epoxy resin and the amine compound to introduce the basic groups can be effected before or after the reaction of the epoxy resin with the carboxy group containing isocyanate at temperatures from 20° to 150° C. In general, the presence of solvents during the reaction is preferred. The weight ratios between the reaction partners or pairs are chosen in order to assure that the total amine content has reacted with the epoxy resin and that a small excess of epoxy groups, in general a maximum of 50% of the groups not having reacted with carboxy groups, remains free.

The binders prepared according to the invention can be diluted to the desired concentration with solvents. Upon at least partial neutralization of the basic groups of the binders with organic or inorganic acids, such as formic acid, acetic acid, propionic acid, lactic acid or phosphoric acid, clear or opaque aqueous solutions are obtained. The aqueous solutions with a resin content of 10 to 20% do not precipitate nor exhibit other disadvantages after storage periods of several weeks.

The preparation of paints from the binders of the present invention is carried out by grinding the binders in known manner with suitable pigments. The additives and extenders conventionally used in the paint industry can be added. Upon neutralization with an acid, the paints are diluted with water to the desired solids content. The paints can be applied by dipping, flow coating, spraying, and similar methods. The preferred application method is electrodeposition, the cationic character of the binder causing the binder to deposit at the cathode of the electrodeposition system. Curing of the applied coatings is normally effected at 150°–200° C., with curing times of between 5 and 30 minutes. Binders which are produced according to the present invention employing phenolcarboxylic acids as the masking agent offer unique advantages since the phenolic blocking agent remains linked to the binder polymer as an ester linkage with the carboxy group, and thus does not pollute the exhaust system as a volatile decomposition product.

The following examples illustrate the invention without limiting the scope thereof. Percentages refer to weight, if not otherwise stated.

PREPARATION OF POLYISOCYANATE INTERMEDIATES USED IN THE EXAMPLES

Polyisocyanate Adduct (A)

In a reaction vessel equipped with stirrer, reflux condensor, inert gas supply and thermometer 244 g of bis (4-hydroxyphenyl)acetic acid (1 mole) are dissolved in 150 g of methyl ethyl ketone. Upon addition of 1 g of stannous dibutyl laureate, 348 g of toluene diisocyanate (80% 2,4-isomer, 20% 2,6-isomer) are added in one portion at 60° C. and the temperature of the charge is held at 60° C., until the content of free NCO-groups has fallen to 11–12% of the reaction batch. 240 g ethylene glycol monoethylether are slowly added and the exothermic reaction is checked at 80° C. After 1 hour of reaction time at 80° C., the content of free NCO-groups has fallen below 0.5%. The resin has a solids content of 83% and an acid value of 61 mg KOH/g.

Polyisocyanate Adduct (B)

In a reaction vessel equipped as in (A) above, 215 g of ε-caprolactame are melted at 70° C. 1 g of stannous dibutyl laureate is added. At 60° C., 317 g of hexamethylene diisocyanate are added in one portion. The temperature of the charge is held at 60° C. until after 2 to 3 hours the content of free isocyanates has fallen to 13.5%. Then a solution of 150 g of tartaric acid dissolved in 171 g of N,N-dimethyl formamide is added and the reaction charge held at 60° C. until the free isocyanate content has fallen to 0. The solids content of the product is 80% and the acid value of the resin solids is 155 mg KOH/g.

Polyisocyanate Adduct (C)

In a reaction vessel equipped as in (A) above, 134 g of dimethylol propionic acid in 226 g of ε-caprolactame are slowly melted at 110° C. At 60° C., 1 g of stannous dibutyl laureate and 444 g of isophorone diisocyanate are added. The reaction charge due to exotherm rises to 120° C. and is held at 120° C. until the content of free isocyanate groups has fallen below 0.5%. The product has a softening point of 86° C. and an acid value of 65 mg KOH/g.

EXAMPLE 1

475 g of bisphenol diglycidyl ether containing 1 mole of epoxy groups are dissolved by warming in 132 g of butanol-2. Then 0.5 g of triethylamine are added as catalyst, and 275 g of polyisocyanate adduct (A) (containing 0.25 moles carboxy groups) are added and the charge held at a temperature of 125° C. until after about 2 hours the acid value has fallen to 2.4 mg KOH/g. 190 g of ethyleneglycol monoethyl ether is added at 80° C., followed by the addition of 49 g of N-methylethanol amine (0.65 moles) in portions. The reaction is completed by holding the reaction at 130° C. for 3 hours. Upon neutralization with acetic acid, the binder is infinitely soluble in water.

EXAMPLE 2

190 g of a bisphenol diglycidyl ether containing 1 mole of epoxy groups are dissolved in 116 g butanol-2 and are reacted with a blend of 26 g of diethanol amine and 18 g of diethylamine, until a washing with saturated NaCl solution reveals no trace of free bases. Thereafter, 85 g of polyisocyanate adduct (B) are added and the batch is heated to 120° C. After 1 hour of reaction time at 120° C., the acid value has fallen to 1.5 mg KOH/g. The solids content of the resin is 68%, the amine value 92 mg KOH/g.

EXAMPLE 3

175 g of a novolak glycidyl ether containing 1 mole epoxy groups are diluted with 59 g of butanol-2 and heated to 115° C. together with 161 g of polyisocyanate adduct (C) and 0.5 g of triethylamine. After 1-2 hours of reaction time at 115° C., the acid value has fallen below 2 mg KOH/g. The batch is cooled to 100° C., diluted with 117 g of ethylene glycol monoethylether, and then reacted at 100° C. with 74 g of diethanolamine, until the content of free amine has fallen below 1%. The solids content of the resin is 69% and the amine value is 90 mg KOH/g.

The binders prepared in Examples 1-3 when used in the preparation of paints provide paint compositions which can be applied by dipping, flow coating, spraying, and similar methods. However, the paints are particularly adaptable for application by electrodeposition whereby the cationic character of the binder causes the binder to deposit at the cathode of the electrodeposition system. The paint compositions will cure at temperatures of from about 150° to 200° C. at curing times of about 5 to 30 minutes to provide coatings having excellent resistance to corrosion and solvent conditions.

As will be apparent to one skilled in the art, various modifications within the scope of the detailed description can be made to the specific binders of Examples 1-3. Furthermore, various modifications as conventional in the preparation of paints including the addition of various additives and extenders, as is known within the art, can be made to the compositions of the present invention without departing from the scope and spirit of the invention.

It is claimed:

1. Cathodically depositable paint binders water-soluble upon neutralization with acids comprising the reaction product of a polymer having an epoxy equivalent of between about 180 and 1500 with from about 3 to 70 mole percent per mole of epoxy groups on said polymer of a polyisocyanate adduct having substantially no free NCO content and carrying per molecule at least one carboxyl group, said epoxy containing polymer having basic functionality sufficient to solubilize said binder in water upon neutralization with an acid, said basic functionality provided in said polymer through reaction of said epoxy containing polymer with a secondary aliphatic amine or alkanol amine, said reaction product having an acid value of below about 5 mg KOH/g and an amine value of from about 24 to 150 mg KOH/g.

2. The cathodically depositable paint binder of claim 1 wherein said polyisocyanate adduct carries up to 2 carboxyl groups per mole.

3. The cathodically depositable paint binder of claim 1 wherein from 5 to 40 mole percent per mole of epoxy groups on said polymer is reacted with said polyisocyanate adduct.

4. The cathodically depositable paint binder of claim 1 wherein said basic functionality is obtained through the reaction of said secondary aliphatic amine or alkanol amine with at least 50 percent of the epoxy groups on said epoxy containing polymer which are not reacted with the polyisocyanate adduct.

5. The cathodically depositable paint binder of claim 1 wherein said epoxy containing polymer is a polyglycidyl ether of a phenol.

6. The cathodically depositable paint binder of claim 1 wherein said epoxy containing polymer is a polyglycidyl ether of a di- or polyalcohol.

7. The cathodically depositable paint binder of claim 1 wherein part of said epoxy containing polymer is an epoxidized polybutadiene.

8. The cathodically depositable paint binders of claim 1 wherein said polyisocyanate adduct is the reaction product of a dihydroxy carboxylic acid, a diisocyanate, and a monofunctional masking agent for said diisocyanate, the relative mole ratio of the said carboxylic acid, isocyanate, and masking agent being from about 1:2:2 and the average molecular weight of the adduct is below about 2000.

9. An aqueous solution of a cathodically depositable paint binder obtained through the neutralization reaction with an acid of the reaction product of a polymer having an epoxy equivalent of between about 180 and 1500 with from about 3 to 70 mole percent per mole of epoxy groups on said polymer of a polyisocyanate adduct having substantially no free NCO content and carrying per molecule at least one carboxyl group, the basic functionality for neutralization provided in said polymer through reaction of the said epoxy containing polymer with a secondary aliphatic amine or alkanol amine, said water-soluble binder having an acid value of below about 5 mg KOH/g and an amine value of from about 24 to 150 mg KOH/g.

10. The process for producing paint binders soluble upon neutralization with organic or inorganic acids comprising the steps of reacting at a temperature of from about 80° to 160° C. an epoxy group containing polymer having an epoxy equivalent of between about 180 and 1500 with from about 3 to 70 mole percent per mole of epoxy groups on said polymer of a polyisocyanate adduct having substantially no free NCO content and carrying per molecule at least one carboxyl group, and providing basic functionality on said epoxy group containing polymer by reacting epoxy groups on said epoxy containing polymer with a secondary aliphatic amine or alkanol amine at from 20° to 150° C., said reaction being continued until a maximum acid value of 5 mg KOH/g and an amine value of from 24 to 150 mg KOH/g is obtained.

11. The process of claim 10 wherein the reaction of said epoxy containing polymer and polyisocyanate adduct is carried out in the presence of an alkaline catalyst and an organic solvent.

12. The process of claim 10 wherein said secondary aliphatic amine or alkanol amine is reacted with said epoxy group containing polymer prior to reaction with said polyisocyanate adduct.

13. The process of claim 10 wherein said secondary aliphatic amine or alkanol amine is reacted with said epoxy group containing polymer subsequent to reaction with said polyisocyanate adduct.

* * * * *